July 21, 1925.

R. HARRIS 1,546,981

LAWN MOWER

Filed Jan. 16, 1923   2 Sheets-Sheet 1

INVENTOR.
REX HARRIS.
BY A. B. Bowman
ATTORNEY

July 21, 1925.
R. HARRIS
LAWN MOWER
Filed Jan. 16, 1923   2 Sheets-Sheet 2
1,546,981
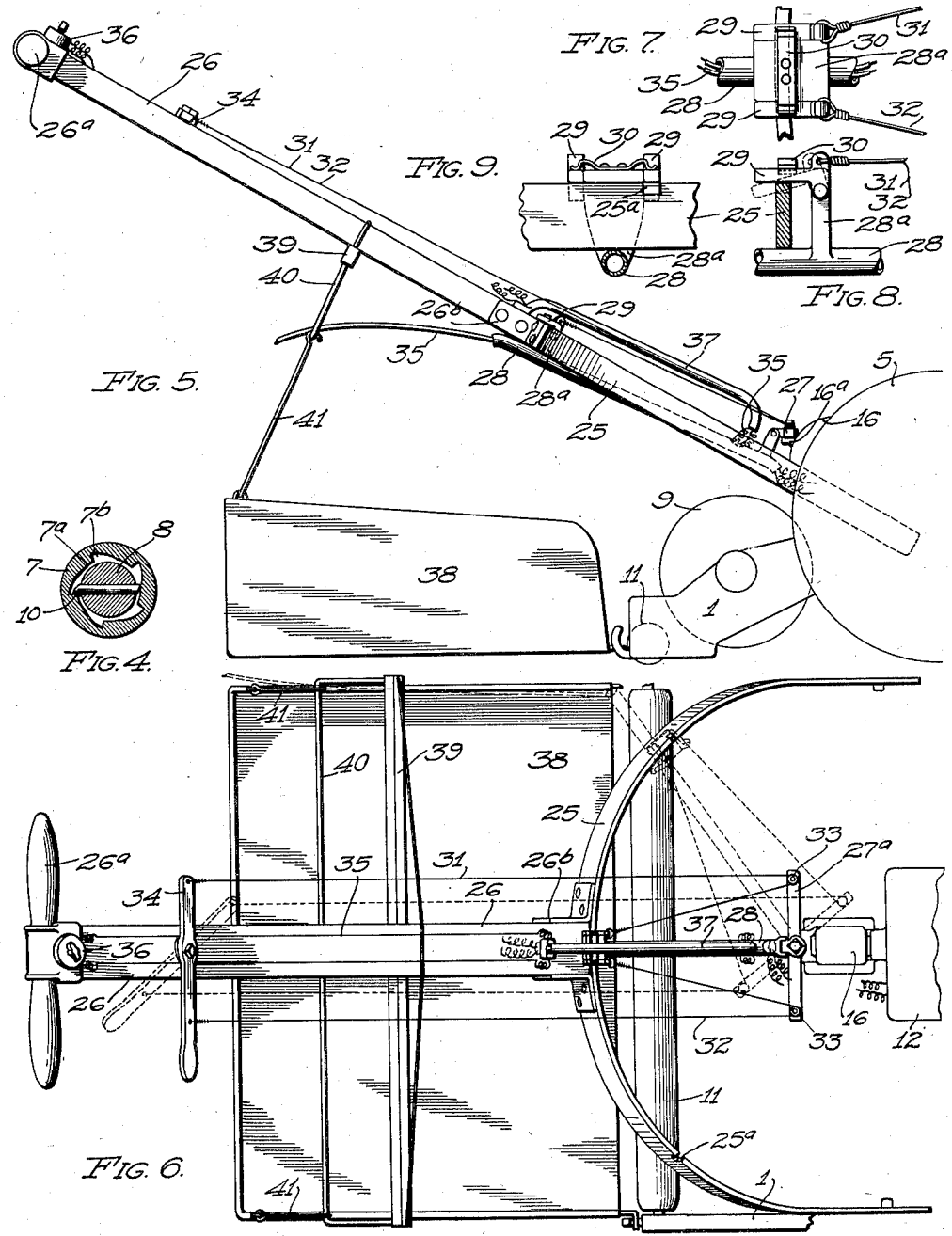
INVENTOR.
REX HARRIS.
BY A.B. Bowman
ATTORNEY Patented July 21, 1925.

1,546,981

UNITED STATES PATENT OFFICE.

REX HARRIS, OF SAN DIEGO, CALIFORNIA, ASSIGNOR OF ONE-HALF TO LUCILE WILLIAMS, OF SAN DIEGO, CALIFORNIA.

LAWN MOWER.

Application filed January 16, 1923. Serial No. 612,984.

*To all whom it may concern:*

Be it known that I, REX HARRIS, a citizen of the United States, residing at San Diego, in the county of San Diego and State of California, have invented certain new and useful Improvements in Lawn Mowers, of which the following is a specification.

My invention relates to lawn mowers, particularly to self-propelled lawn mowers, and the objects of my invention are: first, to provide a self-propelled lawn mower which can be easily guided and manipulated by the operator on foot; second, to provide an electrically driven lawn mower; third, to provide a lawn mower of this class in which the power unit is connected to the driving wheel or driving mechanism by a differential mechanism; fourth, to provide a lawn mower of this class, in which the cord or cable supplying electrical energy to the electric motor, can be easily shifted out of the way, and to one side so that it will not interfere with the grass mowing operation or damage the cable; fifth, to provide a novelly constructed and arranged cable shifting means; sixth, to provide a novelly constructed lawn mower of this class, and seventh, to provide a lawn mower of this class which is very simple and economical of construction, proportionate to its functions, light, compact, efficient, easy to operate and which will not readily deteriorate or get out of order.

Figure 1:
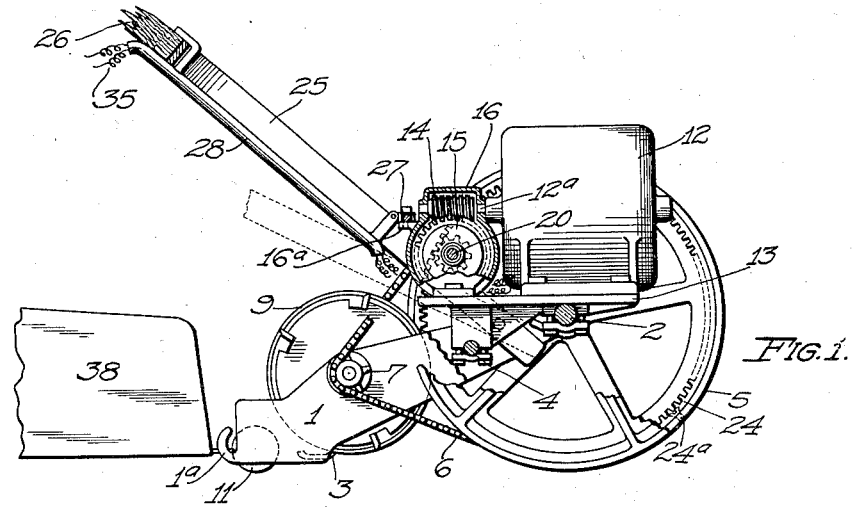
Figure 2:
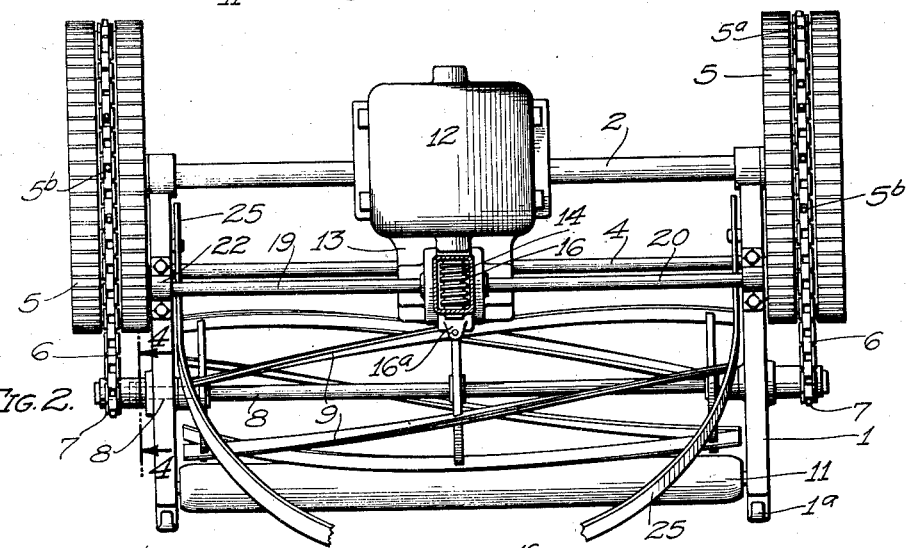
Figure 3:
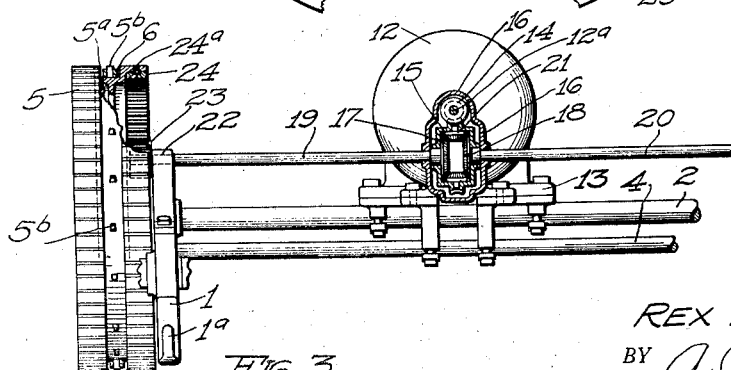

With these and other objects in view as will appear hereinafter, my invention consists of certain novel features of construction, combination and arrangement of parts and portions as will be hereinafter described in detail, and particularly set forth in the appended claims, reference being had to the accompanying drawings and to the characters of reference thereon which form a part of this application, in which:

Figure 1 is a fragmentary side elevational view of my lawn mower, showing certain parts and portions broken away and in section to facilitate the illustration; Fig. 2 is a fragmentary plan view, thereof, with the guiding handle, cable shifting means and other parts and portions broken away; Fig. 3 is a fragmentary rear view, thereof, with the handle cutting member removed and showing certain other parts and portions broken away and in section to facilitate the illustration; Fig. 4 is an enlarged transverse sectional view taken through 4—4 of Fig. 2, of the ratchet arrangement between the driving pinion and the shaft of the cutting member; Fig. 5 is a side view of the guiding handle with the cable shifting means positioned thereon and the means for supporting the grass catcher, showing the mower fragmentarily in outline; Fig. 6 is a plan view thereof, showing portions of the cable shifting means by dotted lines in a certain shifted position; Fig. 7 is an enlarged plan view of a portion of the cable shifting means in relation to the bifurcated handle supporting member, shown fragmentarily; Fig. 8 is a side view thereof, showing by dotted lines, one of the latch members, of the cable shifting device locking the latter in position on the bifurcated guiding handle support, and Fig. 9 is an end view thereof.

Like characters of reference refer to similar parts and portions throughout the several views of the drawings.

The frame members 1, axle 2, cutting bar 3, spacing member 4, driving wheels 5, chains 6, sprocket wheels 7, shaft 8, cutting member 9, pins 10, roller 11, motor 12, motor base 13, worm pinion 14, worm gear 15, housing 16, driven gears 17 and 18, shafts 19 and 20, driving gears 21, journals 22, pinions 23, internal gears 24, handle supporting member 25, guiding handle 26, cable shifting member support 27, cable shifting member 28, latch members 29, spring 30, control cables 31 and 32, sheaves 33, lever 34, electric conductor 35, switch 36, tube 37, grass catcher 38, cross member 39, support 40 and the hooks 41, constitute the principal parts and portions of my lawn mower structure.

The lawn mowing mechanism may be of any convenient form desired. The one illustrated in the drawings, consists chiefly of the frame members 1, spaced from and supported relatively to each other, by the axle 2, at its front end, by the cutting bar 3, near its rear end, and the spacing member 4, intermediate said ends. Driving wheels 5, provided with annular grooves $5^a$ in their outer faces are revolubly mounted on the extended ends of the axle 2. Chains 6 are adapted to ride in the annular grooves $5^a$ of the driving wheels 5, engaging with pins or teeth $5^b$ therein, and are adapted to drive sprocket wheels 7 revolubly mounted on the extended ends of the shaft 8 on which is mounted the cutting member 9, said shaft being revolubly mounted in the frame members 1. The sprocket wheels 7 and the shaft 8 are adapted to revolve relatively to each other in one direction only, the bore $7^a$ of the sprocket wheels being slightly enlarged at their inner ends and provided with notches $7^b$ in the walls thereof forming teeth which are adapted to engage the ends of the pins 10, reciprocably and transversely mounted near the ends of the shaft 8, substantially as shown in Figs. 2 and 4 of the drawings, the ratchet mechanism, being substantially the same as that employed on the conventional lawn mower. A roller 11, is revolubly mounted near the rear end of the frame members 1 to limit the cutting length of the grass. Hook portions $1^a$ are provided at the rear end of the frame members 1 for supporting the grass catcher 38 at its front end in the conventional manner.

An electric motor 12 is mounted on the motor base 13 which is positioned on and secured to the axle 2 and the spacing member 4 as shown best in Fig. 1 of the drawings. Said motor is positioned with its axis at a right angle with axis of the driving wheels, and is provided on one end of its shaft $12^a$ with a worm pinion 14 which meshes with a hollow worm gear 15, said worm gear mechanism being encased and journalled in the housing 16 which is secured to the motor base 13. Said hollow worm gear provides a housing for the differential gearing and revolubly mounted therein and on the same axis therewith are the driven gears 17 and 18 to which are secured respectively the shafts 19 and 20 which extend outwardly therefrom and are revolubly mounted in the housing 16. Also revolubly mounted in the hollow worm gear, but at right angle with the axis thereof, are the driving bevel gears 21 positioned opposite each other and in mesh with the bevel gears 17 and 18. Said shafts 19 and 20 are revolubly mounted near their other ends in the journals 22 which are secured to the upper side of the frame members 1. Said shafts are provided at their ends with pinions 23 which mesh with the internal gears 24, preferably in annular band form and secured on the inside of the flanges of the driving wheels 5 by means of the screws $24^b$. From the internal gear 24, the power is transmitted by the chain 6 to the sprocket wheel 7 from which it is transmitted through the ratchet mechanism, previously described and shown best in Fig. 4 of the drawings, to the cutting member 9.

It obviously follows from this construction, that the power from the motor 12 will be distributed in proper measure to the driving wheels 5, either in mowing grass in a straight path or curved path, and also that the speed of the cutting member 9 will be the same as the greater speed of either of the sprocket wheels.

I have provided a guiding means for my lawn mower which consists chiefly of the bifurcated handle supporting member 25, pivotally mounted at the free ends of the bifurcated portions on the frame members 1, and the guiding handle 26 which is provided with a cross piece $26^a$ at its upper outer end. The bifurcated guiding handle supporting member 25 is semi-circular in shape at its outer end and is secured to the handle 26 by the angle members $26^b$. A lug $16^a$ is provided on the outer side of the housing 16 to which is rotatably secured the cable shifting member support 27, rotatable in a substantially horizontal plane. The cable shifting member 28 which consists of a hollow tube, is pivotally mounted at its front end on said shifting member support 27, shiftable in a vertical plane, thus providing a universal joint between said cable shifting member and the housing 16. Near the other end of said cable shifting member is provided a lug $28^a$ which extends upwardly therefrom substantially at a right angle and thence outwardly parallel with said conductor forming a channel for the reception of the handle supporting member 25, on which it is adapted to ride. Pivotally mounted on either side of said lug $28^a$ are the latch members 29 which are also adapted to ride on the upper edge of the member 25 and adapted to engage notches $25^a$ therein when in certain positions relatively to a handle 26 or longitudinal axis of the mower. Said latch members are held in engagement with the member 25 by the spring 30 which is secured to the upper end of the lug $28^a$ and engages said latch members as shown best in Figs. 7, 8 and 9 of the drawings. Said latch members are operated by cables 31 and 32, which extend therefrom around sheaves 33 revolubly mounted on the extended ends of the arms $27^a$ of the support 27. The other ends of said cables are secured to the shifting lever 34, which is pivotally mounted near the upper end of the handle 26, as shown best in Figs. 5 and 6 of the drawings. It will be here noted that when desiring to shift the electrical cable and the shifting member carrying the same, from the position shown by dotted lines in Fig. 6 of the drawings to the position shown by solid lines of the same, the lever 34 is shifted from the position shown by dotted lines to that shown by solid lines which exerts a tensional force on the cable 31, releasing one of the latches 29, to which the cable 31 is connected, from the notch in the member 25 and by continued tension on said cable, the cable shifting member 28 will be shifted to the position shown by solid lines. By further shifting the lever 34 and applying tension on said cable the cable shifting member 28 will be rotated so that the other latch 29 will be shifted towards and drop into the other notch 25ª on the opposite side of the member 25 thus shifting the electric cable from one side of the mower to the other and locking the same in position.

The electric cable 35 which supplies the electrical energy extends through the shifting member 28 to the motor 12, as shown in Figs. 5 and 6 of the drawings. A switch 36 is provided near the cross bar 26ª of the handle 26 to turn the power on and off as desired. The conductors from said switch extend downwardly from the handle thence through a tube 37 which is bridged over the path of the lug 28ª, latches 29 and springs 30, and extends from the end of said tube into an opening in the shifting member 28 as shown in Fig. 5 of the drawings.

When using the grass catcher 38, with my mower, the conventional support therefor obviously interferes with the shifting of the cable 35. To eliminate such interference I have provided a cross bar 39 secured to the handle 26 which extends to or beyond the edge of the grass catcher 38 and on the ends and lower side of which is secured a U-shaped supporting member 40 on which the cable 35 is adapted to ride. I have provided hooks 41 on each side of the grass catcher near the back side thereof which are adapted to extend upwardly and hook over the supporting member 40 near its ends, thus providing a substantial support for said grass catcher without interfering with the shifting of the electric cable 35.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

It is obvious from this construction, that there is provided a self-propelled lawn mower which can be easily guided and manipulated by the operator on foot; that I have provided an electrically driven lawn mower of this class, in which the power unit is connected to the driving wheels by a differential mechanism; that I have provided a lawn mower of this class in which the cord or cable supplying the electrical energy to the motor can be easily shifted out of the way and to one side so that it will not interfere with the grass mowing operation or damage the cable; that I have provided a novelly constructed and arranged cable shifting means; that I have provided a novelly constructed lawn mower of this class, and that I have provided a lawn mower of this class which is very simple and economical of construction, proportionate to its functions, light, compact efficient, easy to operate and which will not readily deteriorate or get out of order.

Having thus described my invention, what I claim as new and desire to secure by Letters Patent, is:

1. A lawn mower, including a frame, driving wheels mounted on said frame, a cutting member mounted on said frame, an electric motor supported by said frame, an electric cable connected to said motor and adapted to be connected to a source of electrical energy, and a cable shifting means for shifting said cable out of the way of the path of said lawn mower.

2. A lawn mower, including a frame, driving wheels mounted on said frame, a cutting member mounted on said frame, an electric motor supported by said frame, an electric cable connected to said motor and adapted to be connected to a source of electrical energy, a cable shifting means for shifting said cable out of the way of the path of said lawn mower, and a means for locking said cable shifting means in certain positions.

3. A lawn mower, including a frame, an axle mounted in said frame, driving wheels mounted on said axle, a cutting member revolubly mounted on said frame, driving means connecting said driving wheels with said cutting member, a motor supported by said frame, an electric cable connected to said motor, and adapted to be connected to a source of electrical energy, and a cable shifting means for shifting said cable out of the way of the path of said lawn mower.

4. A lawn mower, including a frame, an axle mounted in said frame, driving wheels mounted on said axle, a cutting member revolubly mounted on said frame, driving means connecting said driving wheels with said cutting member, a motor supported by said frame members, an electric cable connected to said motor, and adapted to be connected to a source of electrical energy, a cable shifting means for shifting said cable out of the way of the path of said lawn mower, and a means for locking said cable shifting means in certain positions.

In testimony whereof, I have hereunto set my hand at San Diego, California, this 6th day of January, 1923.

REX HARRIS.